Nov. 11, 1969     TAMIJI NAGAI     3,478,258
TRANSFORMERLESS VOLTAGE REDUCING RECTIFIER CIRCUIT
Filed May 20, 1968     3 Sheets-Sheet 1
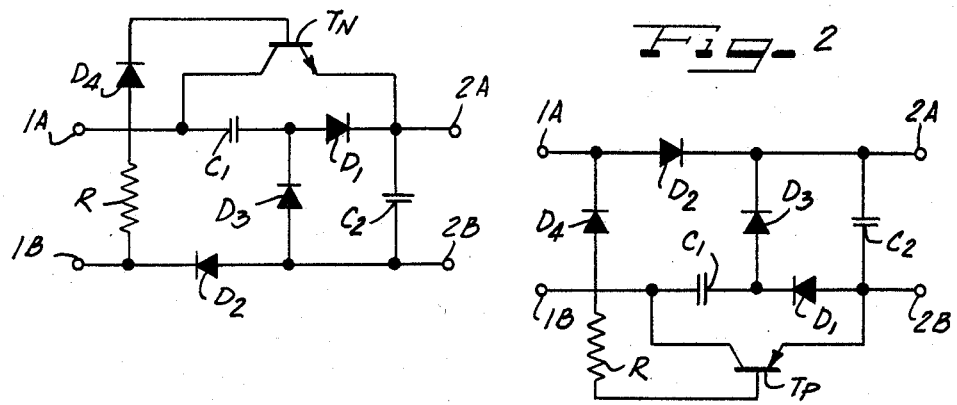
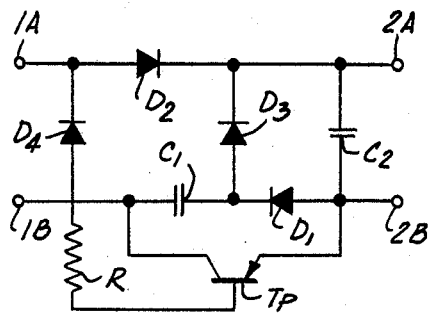
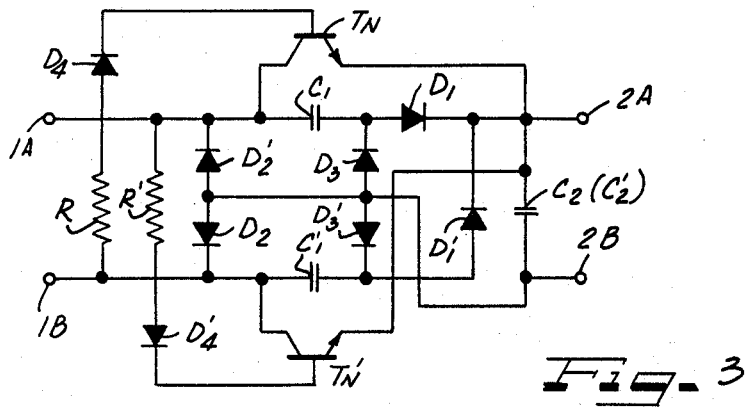
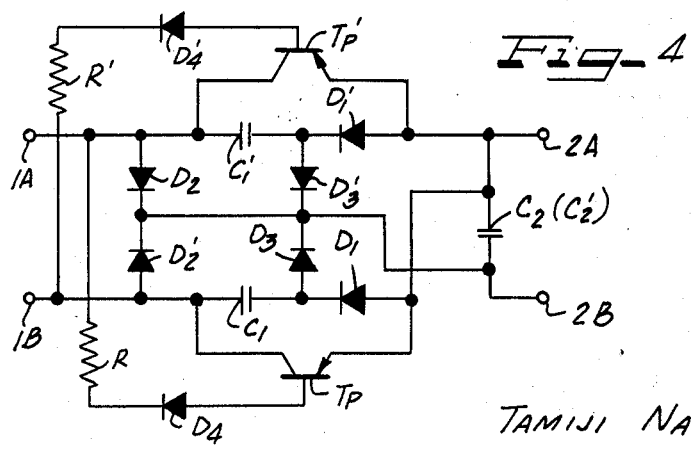
INVENTOR.
TAMIJI NAGAI
BY _____ ATTORNEYS

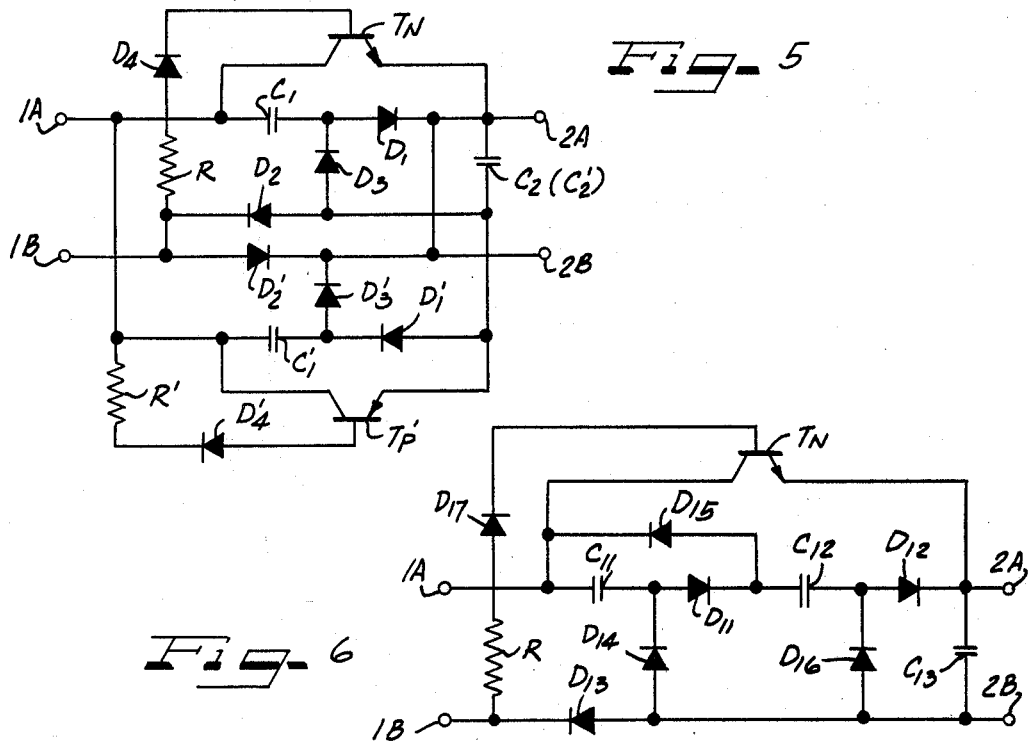
Fig. 5
Fig. 6
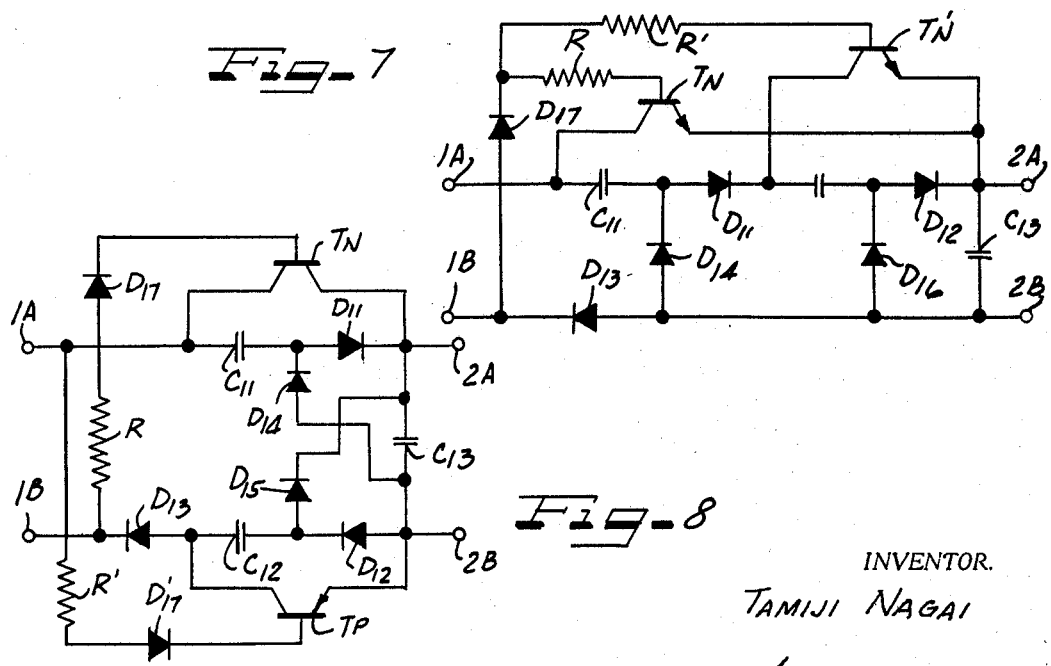
Fig. 7
Fig. 8
INVENTOR.
TAMIJI NAGAI
BY *Hill, Sherman, Meroni, Gross & Simpson* ATTORNEYS

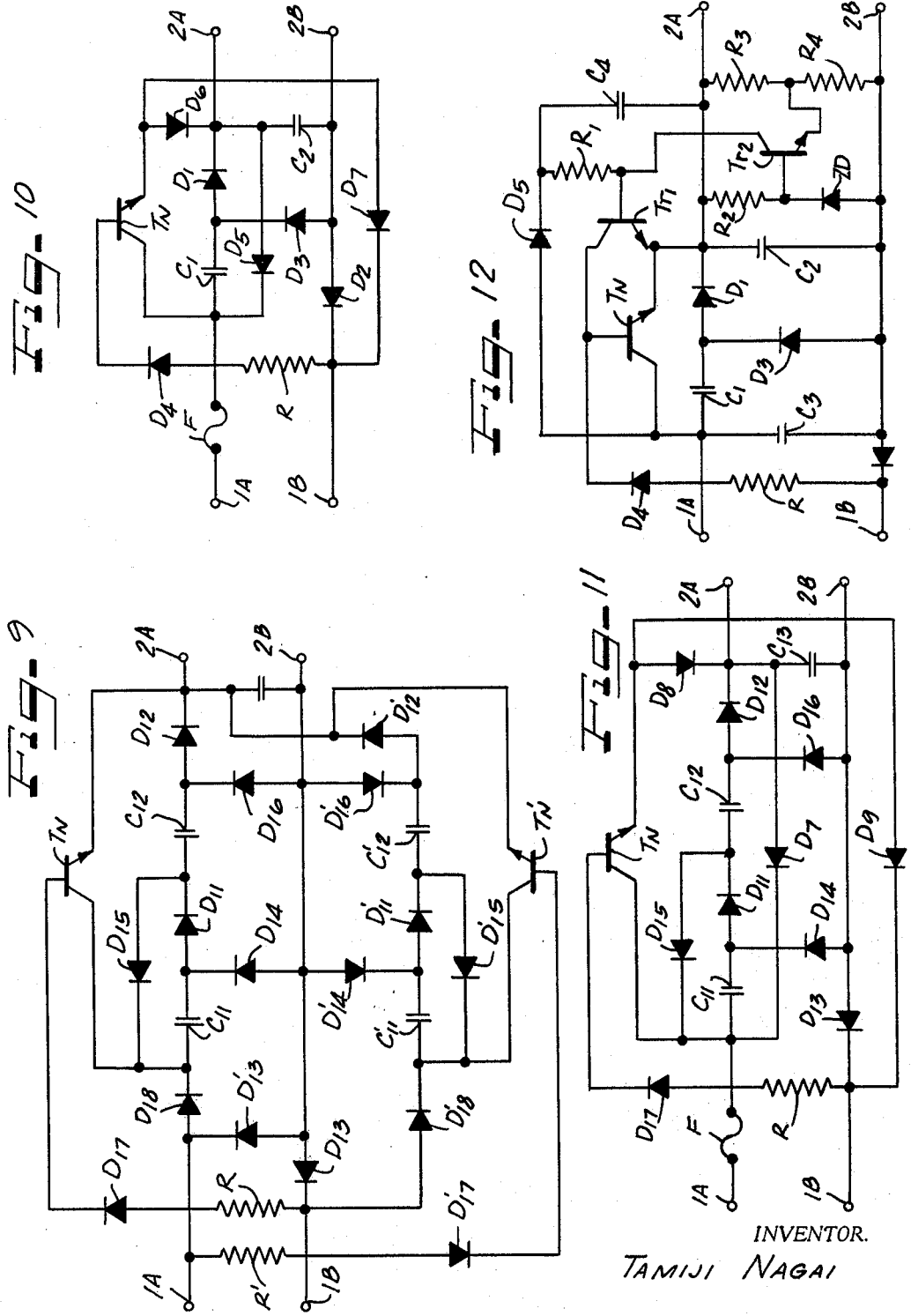

United States Patent Office 3,478,258
Patented Nov. 11, 1969

3,478,258
TRANSFORMERLESS VOLTAGE REDUCING
RECTIFIER CIRCUIT
Tamiji Nagai, Tokyo, Japan, assignor to Sony Corporation, Tokyo, Japan, a corporation of Japan
Filed May 20, 1968, Ser. No. 730,435
Claims priority, application Japan, May 24, 1967, 42/43,793
Int. Cl. H02m 1/08, 7/02
U.S. Cl. 321—15       10 Claims

ABSTRACT OF THE DISCLOSURE

A power supply circuit for converting alternating current voltage to direct current voltage which includes a plurality of capacitors connected in series with a pair of input terminals and wherein the input terminals are arranged for connection with an AC voltage source. Rectifier means are also connected in series with the capacitors to provide a unidirectional current flow through the capacitors to charge the capacitors in such a manner as to divide the voltage between the capacitors. One of the capacitors of the series of capacitors is connected across a pair of output terminals to provide a DC voltage at the output terminals. A current control device is connected in circuit with the series of capacitors to cause the current charge from the remaining capacitors to be delivered to the capacitor connected across the output terminals.

BACKGROUND OF THE INVENTION

Field of the invention

This invention relates to power supply circuits, and more particularly to power supply circuits for supplying regulated direct current voltage.

Description of the prior art

In known circuits of this kind an alternating current voltage is reduced or stepped down by a transformer and then rectified. However, this method presents a problem as it necessitates the use of bulky, heavy and expensive power supply components. Furthermore, the transformer yields magnetic flux leakage which generates noise such as hum and the like and this noise is picked up by an amplifier which is being operated by the power supply.

Additionally, the reduction of alternating current voltage may be accomplished by the employment of a bleeder resistor, but this also possesses defects such as appreciably great power loss and poor voltage regulation.

SUMMARY OF THE INVENTION

The present invention resides in the provision of power supply circuits which are free from the drawbacks experienced in power supply circuits of the prior art through the use of rectifiers, transistors and capacitors.

It is a primary object of this invention to avoid the use of a step down transformer to reduce the voltage of an alternating current voltage source.

It is another object of this invention to provide power supply circuits in which rectified direct current voltage of alternating current voltage is converted into a lower voltage by means of capacitors.

It is still another object of this invention to provide a power supply circuit in which the output voltage is regulated by making use of electric charge of a capacitor.

It is a further object of this invention to provide a transformerless power supply circuit for supplying and stabilizing low voltage direct current electric power.

It is still a further object of this invention to provide a transformerless power supply circuit which is adapted to obviate the risk of destruction of a powered apparatus resulting from failure of any circuit components of the power supply.

It is another object of this invention to provide a transformerless power supply circuit which controls the quantity of electric charge of a capacitor supplied to a load in response to the variations in a load current to provide stabilized low direct current voltage.

Other objects, features and advantages of this invention will become apparent from the following detailed description when taken in conjunction with the accompanying drawings wherein like reference numerals throughout the various views of the drawings are intended to designate similar components.

BRIEF DESCRIPTION OF THE DRAWINGS

FIGURES 1 to 12 are schematic circuit diagrams illustrating embodiments of this invention.

In FIGURE 1 there is illustrated one example of this invention, in which a first capacitor $C_1$, a first semiconductor diode $D_1$, a second capacitor $C_2$ and a second semiconductor diode $D_2$ are connected in series between AC voltage input terminals 1A and 1B. Further, the cathode and anode of a third semiconductor diode $D_3$ are respectively connected to the connection points between the first capacitor $C_1$ and diode $D_1$ and between the second capacitor $C_2$ and diode $D_2$. The second capacitor $C_2$ is connected at both ends to DC signal output terminals 2A and 2B. In addition, a fourth semiconductor diode $D_4$, of forward bias connection, and a resistor R are connected in series between the base of an NPN-type transistor $T_N$ and the input terminal 1B. The collector of transistor $T_N$ is connected to the other input terminal 1A and the emitter is connected to the output terminal 2A.

During the operation of the circuit arrangement of FIGURE 1, positive half-cycles of an AC signal applied between the input terminals 1A and 1B in which the input terminal 1A is positive and the input terminal 1B negative, the transistor $T_N$ is in the cut-off condition, to cause current flow from the input terminal 1A to the input terminal 1B through the first capacitor $C_1$, the first diode $D_1$, the second capacitor $C_2$ and the second diode $D_2$, so that a rectified AC signal is divided and filtered by the first and second capacitors $C_1$ and $C_2$. This produces at the output terminals 2A and 2B a DC output voltage such as follows:

$$\frac{C_1}{C_1+C_2} E_{AC} = E_{DC}$$

where $E_{AC}$ is the peak voltage of the AC signal.

During the negative half-cycle when the input terminal 1A is negative and the input terminal 1B is positive, the first and second diodes $D_1$ and $D_2$ are reversed biased to inhibit current flow therethrough, but the transistor $T_N$ is conductive. Consequently, if the potential of the first capacitor $C_1$ exceeds that of the second capacitor $C_2$, a current flows from the first capacitor $C_1$ through the collector and emitter of the transistor $T_N$, the second capacitor $C_2$ and the third semiconductor diode $D_3$ back to the first capacitor $C_1$, thereby feeding the electric charge of the first capacitor $C_1$ to the second capacitor $C_2$. Namely, the second capacitor $C_2$ at the output of the power supply receives positive half cycles from the AC signal and further receives the electric charge of the first capacitor $C_1$ during negative half cycles so that a substantially constant DC voltage is applied to a load which may be connected between the output terminals 2A and 2B. A fourth semiconductor diode $D_4$ and a resistor R are provided for protecting the transistor $T_N$.

Thus, the present invention readily provides a reduced DC output which is lower than an input AC signal and the voltage is regulated by the combined use of a transistor, capacitors, semiconductor diodes and a resistor.

According to my experiment employing the above circuit construction when the capacitors $C_1$ and $C_2$ having the same capacity of 200 μf. were used and the input AC voltage was 100 volts RMS, a DC output of 70 volts was obtained between the output terminals 2A and 2B. It was found in the experiment that in the above case when a load current was varied from 0 to 1.0 a. the voltage regulation was −5 v. and that when the input voltage was varied ±10 v. the voltage regulation would similarly vary between ±5 v.

In the foregoing example the fourth diode $D_4$ is interposed between the base of the transistor $T_N$ and the resistor R but it may be connected between the connection point of the input terminal 1B to the second diode $D_2$ and the resistor R. Further, the transistor $T_N$ may be substituted by another electronic component having the same function as the transistor.

FIGURE 2 illustrates another example of the present invention, in which similar elements to those in FIGURE 1 are identified by the similar reference numerals for convenience of explanation. In this case a second semiconductor diode $D_2$ having a polarity as indicated in the figure, a second capacitor $C_2$, a first semiconductor diode $D_1$ of a polarity as shown in the figure and a first capacitor $C_1$ are connected in series between AC signal input terminals 1A and 1B. That is, these connections correspond to those in FIGURE 1 in which the diode $D_1$ and $D_2$ are exchanged in position with their polarities being reversed. Further, a third semiconductor diode $D_3$ having a polarity as indicated in the figure is connected between the connection point of the first capacitor $C_1$ to the diode $D_1$ and that of the second capacitor $C_2$ to the diode $D_2$. The resistor R and the fourth conductor diode $D_4$ are connected in series between the base of a PNP-type transistor $T_P$ and the one input terminal 1A, the collector of which transistor is connected to the other input terminal 1B and the emitter of which is connected to the one output terminal 2B. The second capacitor $C_2$ is connected at both ends to the DC signal output terminals 2A and 2B.

Also in this case, during the positive half-cycle of an AC signal fed to the input terminals 1A and 1B making the former 1A positive and the latter 1B negative, the transistor $T_P$ is held in its quiescent state, and consequently a current flows from the one input terminal 1A to the other input terminal 1B through the second diode $D_2$, the second capacitor $C_2$, the first diode $D_1$ and the first capacitor $C_1$ and, as a result, a rectified AC signal is voltage-divided and smoothed by the first and second capacitors $C_1$ and $C_2$. Consequently, the resulting DC output voltage yielded at the output terminals 2A and 2B is as follows:

$$\frac{C_1}{C_1+C_2}E_{AC}$$

where $E_{AC}$ is the peak voltage of the AC signal. During the negative half-cycle of the AC signal applied to the input terminals 1A and 1B, the first and second diodes $D_1$ and $D_2$ are non-conductive and hence no current flows. While, the transistors $T_P$ is conductive, so that if the potential of the first capacitor $C_1$ is higher than that of the second capacitor $C_2$, a current circulates from the first capacitor $C_1$ through the third diode $D_3$, the second capacitor $C_2$ and the emitter and collector of the transistor $T_P$ and thence back to the first capacitor $C_1$. This leads to application of the electric charge of the first capacitor $C_1$ to the second capacitor $C_2$. That is, the second capacitor $C_2$ on the output side is alternately supplied with the positive half-cycles of the AC signal and the electric charge of the first capacitor $C_1$, permitting supply of a substantially constant DC voltage to a load connected between the output terminals 2A and 2B. In this manner, the present embodiment yields the same effect as that obtainable with the example depicted in FIGURE 1. The only difference being that in FIGURE 1 the terminal 2A is positive with respect to terminal 2B, and in FIGURE 2 the terminal 2A is negative with respect to terminal 2B.

In FIGURE 3 there is still another example of this invention, in which the half-wave rectifier circuit exemplified in FIGURE 1 is replaced with a full-wave rectifier circuit and in the figure the similar parts to those in FIGURE 1 are identified by the similar reference numerals for those of the positive half-cycle and those of the negative half-cycle are identified with prime numbers. No description on the circuit elements will be given for the sake of brevity.

With such a circuit construction as shown in the figure, during the positive half-cycle of the AC signal current flows from the input terminal 1A to the input terminal 1B through the first capacitor $C_1$, the first diode $D_1$, the second capacitor $C_2$ and the second diode $D_2$. Accordingly, the rectified AC signal is voltage-divided and filtered by the first and second capacitors $C_1$ and $C_2$, and, as a result of this, the DC output voltage yielded at the output terminals 2A and 2B is as follows:

$$\frac{C_1}{C_1+C_2}E_{AC}=E_{DC}$$

where $E_{AC}$ is the peak voltage of the AC signal. During the negative half-cycle, the transistor $T_N$ is made conductive, so that if the potential of the first capacitor $C_1$ is higher than that of the second capacitor $C_2$, a current flows from the first capacitor $C_1$ through the collector and emitter of the transistor $T_N$, the second capacitor $C_2$ and the third diode $D_3$ and thence back to the first capacitor $C_1$, thus feeding the electric charge of the first capacitor $C_1$ to the second capacitor $C_2$. At the same time, current flows from the input terminal 1B through the first capacitor $C_1'$, the first diode $D_1'$, the second capacitor $C_2$ and the second diode $D_2'$ and thence back to the input terminal 1A, and the AC signal is voltage-divided and filtered by the first and second capacitors $C_1'$ and $C_2'$. Furthermore, during the next positive half-cycle the transistor $T_N'$ is conductive, so that if the potential of the first capacitor $C_1$ exceeds that of the second capacitor $C_2$, a current flows from the first capacitor $C_1'$ through the transistor $T_N'$, the second capacitor $C_2$ and the third diode $D_3'$ and thence back to the first capacitor $C_1'$, thereby applying the electric charge of the first capacitor $C_1'$ to the second capacitor $C_2$.

Thus, the second capacitor $C_2$, which also acts as capacitor $C_2'$, is supplied with both positive and negative cycles of the AC signal and the electric charges from the first capacitors $C_1$ and $C_1'$, which provides a regulated DC voltage having a smaller voltage than that obtainable in the example depicted in FIGURE 1 or 2.

FIGURE 4 illustrates a further example in which the half-wave rectifier circuit shown in FIGURE 2 is substituted with a full-wave rectifier circuit, and the similar elements to those in FIGURE 2 are designated by the similar reference numerals for those of the positive half-cycle with the primes for those of the negative half-cycle and no detailed description will be given on the circuit elements.

The present example also provides a regulated DC voltage of a lower voltage than that obtainable with the circuits illustrated in FIGURES 1 and 2. In this case, the output terminal 2B is positive while the output terminal 2A negative.

In FIGURE 5 there is illustrated still a further embodiment of this invetnion in which a full-wave rectifier circuit is made up with the half-wave rectifier circuits depicted in FIGURES 1 and 2 in combination. Since it will be apparent that the present example also yields the same operational effect as the aforementioned one, the similar elements to those in FIGURE 1 are indicated by the similar reference numerals and the corresponding elements to those of FIGURE 2 are designated by the same reference numerals with primes. No description will be given in connection with the circuit elements.

FIGURES 6 to 9 illustrate other embodiments of this invention in which three capacitors $C_{11}$, $C_{12}$ and $C^{13}$ are connected in series between AC signal input terminals 1A and 1B for voltage-dividing and filtering of an AC signal to provide a regulated DC output of low voltage.

In FIGURE 6 a first capacitor $C_{11}$, a first semiconductor diode $D_{11}$ having a polarity as indicated in the figure, a second capacitor $C_{12}$, a second semiconductor diode $D_{12}$ having a polarity as shown in the figure, a third capacitor $C_{13}$ and a third semiconductor diode $D_{13}$ having a polarity as indicated in the figure are respectively connected in series between the input terminals 1A and 1B. During the positive half-cycle of the AC signal, a current flows from the input terminal 1A to the input terminal 1B through the first capacitor $S_{11}$, the first diode $D_{11}$, the second capacitor $C_{12}$, the second diode $D_{12}$, the third capacitor $C_{13}$ and the third diode $D_{13}$, thereby charging the capacitors $C_{11}$, $C_{12}$ and $C_{13}$. During the negative half-cycle of the AC signal, the NPN-type transistor $T_N$ becomes conductive, so that the electric charge of the first capacitor $C_{11}$ circulates therefrom through the transistor $T_N$, the third capacitor $C_{13}$ and the fourth diode $D_{14}$ and thence back to the first capacitor $C_{11}$, and at the same time the electric charge of the second capacitor $C_{12}$ flows through a fifth diode $D_{15}$, the transistor $T_N$, the third capacitor $C_{13}$ and a sixth diode $D_{16}$ and thence back to the capacitor $C_{12}$. As a result of this, the third capacitor $C_{13}$ is always charged which permits the application of a substantially constant DC voltage to the output terminals 2A and 2B connected to both ends of the third capacitor $C_{13}$. In this case the DC voltage of the output terminals is as follows:

$$\frac{C_{11}C_{12}}{C_{11}C_{12}+C_{12}C_{13}+C_{13}C_{11}}E_{AC}=E_{DC}$$

where $E_{AC}$ is a peak voltage of the AC signal, so that if the capacitors are equal in capacity, ⅓E is resulted. A resistor R and a seventh diode $D_{17}$ are to protect the transistor $T_N$.

Thus, an increase in the number of the capacitors connected in series allows further reduction of the DC output voltage appearing between the output terminals 2A and 2B. Also in this case the same operational effect as the aforementioned one can be obtained apparently, and hence no further detailed description will be given for the sake of simplicity.

FIGURE 7 illustrates still another example of this invention which is the same as the example of FIGURE 6 except in that the fifth diode $D_{15}$ is replaced with an NPN-type transistor $T_N'$. The similar elements to those in FIGURE 6 are marked with the same reference numerals and no description will be repeated in connection with the circuit elements. A resistor R' and a diode $D_{17}$ are to protect the transistor $T_N'$.

FIGURE 8 illustrates still a further example of this invention in which the second capacitor $C_{12}$ and the second diode $D_{12}$ in FIGURE 7 are disposed between the third capacitor $C_{13}$ and the third diode $D_{13}$ and the NPN-type transistor of the charging circuit of the second capacitor $C_{12}$ for the third capacitor $C_{13}$ is replaced with a PNP-type transistor $T_P$. Also in this case, the operation and effects are the same as those obtainable in the examples shown in FIGURES 6 and 7, and the similar elements to those in the figures are identified by the similar reference numerals and no description will be made in connection with the circuit elements. A resistor R' and a diode $D_{17}'$ are provided for protecting the transistor $T_P$.

In FIGURE 9 there is illustrated another embodiment of this invention which employs a full-wave rectifier circuit in place of the half-wave rectifier circuit shown in FIGURE 6. The corresponding elements to those in FIGURE 6 are designated by the same reference numerals for those of the positive half-cycle and with primes for those of the negative half-cycle. No detailed description will be given of the circuit elements. In the present example, an eighth diode $D_{18}$ is provided for preventing charging of the first capacitor $C_{11}$ during the negative half-cycle and another eighth diode $D_{18}'$ is for preventing charging of another first capacitor $C_{11}'$ during the positive half-cycle.

However, the circuit constructions described in the foregoing is encountered with a drawback such that when the rectifier element, for example, the diode is short-circuited, an overcurrent flows to the output side to destroy the active element such as the transistor connected as a load. FIGURES 10 and 11 show embodiments of this invention which are improved from the foregoing examples to avoid such a drawback experienced therein. For convenience of illustration, the similar elements to those in FIGURE 1 are identified by the similar reference numerals, and no description will be repeated in connection with them.

As illustrated in FIGURE 10, a fifth semiconductor diode $D_5$ having a polarity as indicated in the figure is connected between the connection point of the diode $D_1$ to the second capacitor $C_2$ of the output side and that of the input terminal 1A to the first capacitor $C_1$, by which an overcurrent resulting from short-circuiting of the rectifier element, i.e., the second diode $D_2$ is caused to flow to the side of the input power source to blow a circuit cutoff means F such, for example, as a fuse, thereby avoiding the possibility of flowing of the overcurrent to a load connected between the output terminals 2A and 2B.

That is, when the second diode $D_2$ is short-circuited, during the negative half-cycle of the input signal the overcurrent flows from the input terminal 1B to the other input terminal 1A through the third diode $D_3$, the first diode $D_1$, the fifth diode $D_5$ and the fuse F. Further, since the power source impedance of the input side is lower than the impedance of the load, the electric charge of the first capacitor $C_1$ is discharged through the fuse F, the input terminal 1A, the input terminal 1B, the third diode $D_9$ and the first capacitor $C_1$. At the same time, the electric charge of the capacitor $C_2$ on the output side is also discharged through the fifth diode $D_5$, the fuse F, the input terminal 1A, the input terminal 1B and the capacitor $C_2$. No voltage higher than that initially charged in the output side capacitor $C_2$ is produced between the output terminals 2A and 2B, and the fuse F is blown almost instantaneously by the aforementioned overcurrent to cut off the load from the power source. This ensures that the load is not subjected to the overcurrent and hence eliminates the possibility of destruction of the active elements such as transistors.

In FIGURE 10 a sixth semiconductor diode $D_6$, connected between the connection point of the first diode $D_1$ to the capacitor $C_2$ on the output side and the emitter of the transistor $T_N$ and having a polarity as indicated in the figure, is provided for avoiding destruction of the transistor $T_N$ when the capacitor $C_2$ is charged with high voltage (twice as high as the input voltage) during the negative half-cycle of the input signal in case of short-circuiting of the second diode $D_2$. Further, a seventh semiconductor diode $D_7$, connected between the connection point of the input terminal 1B to the second diode $D_2$ and the emitter of the transistor $T_N$ and having a polarity as shown in the figure, is provided for preventing charging of the capacitor $C_2$ with high voltage (twice as high as the input voltage) in case of short-circuiting of the transistor $T_N$. However, since the short-circuiting of the transistor $T_N$ is far less than that of the diodes $D_1$ to $D_3$, it is normally sufficient for the purpose to incoporate only the fifth and sixth diodes $D_5$ and $D_6$ in the circuit.

FIGURE 11 shows another example of this invention which is an improvement of the circuit of FIGURE 6. That is, second, eighth and ninth semiconductor diodes $D_7$, $D_8$ and $D_9$ are connected in the same manner as in the example of FIGURE 10 as illustrated, in which case the DC voltage produced between the output terminals 2A and 2B is as follows:

$$\frac{C_{11}C_{12}}{C_{11}C_{12}+C_{12}C_{13}+C_{13}C_{11}}E_{AC}=E_{DC}$$

Even if the diode $D_{13}$ or the transistor $T_N$ has short-circuited, it does not exert any bad influence upon the output due to the same effect as the diodes $D_5$, $D_6$ and $D_7$ of the example depicted in FIGURE 10.

The embodiments shown in FIGURES 10 and 11 employ a fuse F as the circuit cut-off means by the overcurrent, but the fuse F may be replaced with, for example, a relay, switch or the like and its connecting position need not be limited specifically to the illustrated one. Further, although the present invention has been described chiefly in connection with the full-wave rectifier circuit, the invention is likewise applicable to the aforementioned full-wave rectifier circuit.

FIGURE 12 illustrates still another improved circuit arrangement of the present invention as depicted in FIGURE 1. The circuit exemplified in FIGURE 1 is excellent in voltage regulation, as compared with the conventional power supply circuit. However, in order to obtain a further stable output, it is required to connect a usual constant-voltage circuit to the illustrated output circuit. In the example shown in FIGURE 12 the output circuit performs the function of the constant-voltage circuit which varies the impedance of the transistor $T_N$ in response to the variations in the output voltage.

As illustrated in the figure, the collector and emitter of the NPN-type transistor $Tr_1$ are respectively connected between the base and emitter of the transistor $T_N$, and the base of the transistor $Tr_1$ is connected to the collector of a transistor $Tr_2$ for detecting the voltage variations. The rectified output is fed as a bias from the connection point of the diode $D_5$ and the capacitor $C_4$ to the base of the transistor $Tr_1$ through a resistor $R_1$. The emitter of the transistor $Tr_2$ is connected to the midpoint of resistors $R_3$ and $R_4$ connected in series between the output terminals 2A and 2B, while the base is connected to the midpoint of a series circuit of a resistor $R_2$ and a Zener diode ZD, thereby producing a constant voltage.

With lowering of the voltage between the terminals 2A and 2B, a current flowing through the resistor $R_4$ also decreases to cause a decrease in the emitter voltage of the transistor $Tr_2$. Since the base voltage of the transistor $Tr_2$ is always constant, the collector current of the transistor $Tr_2$ increases to cause an increase in a current passing through the resistor $R_1$. While, the base current of the transistor $Tr_1$ decreases and the impedance between its emitter and collector increases, so that a switching signal applied to the base of the transistor $T_N$ through the resistor R and the diode $D_4$ readily passes between the base and emitter of the transistor $Tr_1$ to provide for reduced impedance between the collector and emitter of the transistor $T_N$. This leads to an increase in the quantity of the electric charge of the capacitor $C_1$ fed to the output circuit during the negative half-cycle to ensure prevention of lowering of the output voltage.

A capacitor $C_3$ incorporated in the circuit of FIGURE 12 is to apply electric charge to the capacitor $C_2$ when the input AC voltage decreases temporarily or a great current flows to the output side.

Further, in the present example one portion of the base bias of the transistor $Tr_1$ is produced by rectifying the input signal with the diode $D_5$, so that in the case of the variations in the input AC voltage the current flowing through the resistor $R_1$ varies to cause the variations in the impedance of the transistor $TR_1$, by which the transistor $T_N$ is controlled, as described above, to stabilize the output voltage.

While the embodiment of FIGURE 12 discloses one improvement in the half-wave rectifier circuit, it may be similarly applied to the full-wave rectifier circuit.

It will be apparent that modifications and variations may be effected without departing from the scope of the novel concepts of this invention.

I claim as my invention:

1. A power supply circuit comprising:
   (a) at least two capacitors,
   (b) at least two rectifier means connected to said capacitors and connected in the same conductive direction,
   (c) means for supply said capicators and said rectifier means with an AC input signal, said capacitors being charged during one-half cycle of said AC input signal,
   (d) means for feeding a voltage across one of the capacitors to the output of the power supply, and
   (e) means for applying the electric charge of the other capacitor to said one capacitor during the other half-cycle of the AC input signal.

2. A power supply circuit according to claim 1 including means for detecting an overcurrent for stopping supply of the input AC signal, and means for flowing to the input signal supply means the overcurrent caused by short-circuiting of the rectifier means.

3. A power supply circuit according to claim 1 including means for controlling the electric charge supply means in response to the variations in the output voltage.

4. A power supply circuit for converting alternating current voltage to direct current voltage, comprising:
   a pair of input terminals for receiving alternating current voltage from an AC source;
   a pair of output terminals for delivering a direct current voltage to a load;
   first and second capacitor means connected in series with said input terminals;
   rectifier means connected in series and between said first and second capacitor means for causing unidirectional current to flow through said first and second capacitor means during one-half of the alternating current voltage applied to said input terminals thereby developing a direct current voltage which is divided between said first and second capacitor means; and
   current control means connected in circuit with said first and second capacitor for removing the current charge from said first capacitor means and applying said current charge to said second capacitor means during the other half-cycle of the alternating current voltage applied to said input terminals.

5. A power supply circuit according to claim 4 wherein said current control means is an NPN transistor which has collector, emitter and base electrodes, said collector electrode being connected to the junction of one of said input terminals and said first capacitor means, said emitter electrode being connected to the junction of said rectifier means and said second capacitor means, and said base electrode being connected to the other of said input terminals.

6. A power supply according to claim 4 wherein said current control means is a PNP transistor which has collector, emitter and base electrodes, said collector electrode being connected to the junction of one of said input terminals and said first capacitor means, said emitter electrode being connected to the junction of said rectifier means and said second capacitor means, and said base electrode being connected to the other of said input terminals.

7. A power supply circuit according to claim 5 including a diode and resistor connected in series with said base electrode of said NPN transistor.

8. A power supply circuit according to claim 6 further including a diode and a resistor connected in series with said PNP transistor.

9. A power supply circuit for converting alternating current voltage to direct current voltage, comprising:
   a pair of input terminals for receiving alternating current voltage from an AC source;
   a pair of output terminals for delivering a direct current voltage to a load;
   a plurality of capacitor means connected in series with said input terminals, one of said plurality of capacitors connected across said output terminals;
   rectifier means connected in series with said plurality of capacitor means for causing unidirectional current to flow through said plurality of capacitor means during one half-cycle of the alternating current voltage applied to said input terminals thereby developing a direct current voltage which is divided between said plurality of capacitor means; and current control means connected in circuit with said plurality of capacitor means for removing the current charge of at least one of said plurality of capacitor means and applying said current charge to the capacitor means connected across said output terminals during the other half-cycle of the alternating current voltage applied to said input terminals.

10. A power supply according to claim 9 wherein said current control means is a transistor having collector, emitter and base electrodes, said collector and emitter electrodes connected to provide a current path from said other of said plurality of capacitor means to said capacitor means connected across said output terminals.

References Cited

UNITED STATES PATENTS

| 3,177,421 | 4/1965 | Montgomery | 321—15 |
| 3,046,466 | 7/1962 | Tyrrell | 321—15 XR |

FOREIGN PATENTS 877,011   5/1953   Germany.

OTHER REFERENCES

"Voltage Reducing Rectifier Circuits," RCA Technical Notes, RCA TN No. 241.

"D-C Converter Circuit Uses Capacitors," J. M. Marzolf, Electronics, Mar. 21, 1966, pp. 97–98.

JOHN F. COUCH, Primary Examiner

W. M. SHOOP, JR., Assistant Examiner

U.S. Cl. X.R.

307—110; 321—18